United States Patent
Hemati

(10) Patent No.: US 10,608,519 B2
(45) Date of Patent: Mar. 31, 2020

(54) THREE AXIS LINEAR ACTUATOR

(71) Applicant: Nikon Research Corporation of America, Belmont, CA (US)

(72) Inventor: Neyram Hemati, Saratoga, CA (US)

(73) Assignee: Nikon Research Corporation of America, Belmont, CA (US)

( * ) Notice: Subject to any disclaimer, the term of this patent is extended or adjusted under 35 U.S.C. 154(b) by 248 days.

(21) Appl. No.: 15/406,087

(22) Filed: Jan. 13, 2017

(65) Prior Publication Data

US 2017/0207691 A1 Jul. 20, 2017

Related U.S. Application Data

(60) Provisional application No. 62/278,798, filed on Jan. 14, 2016.

(51) Int. Cl.
| | |
|---|---|
| *H02K 41/035* | (2006.01) |
| *H02K 1/34* | (2006.01) |
| *H02K 3/28* | (2006.01) |
| *H02K 1/17* | (2006.01) |
| *H02K 41/03* | (2006.01) |

(52) U.S. Cl.
CPC ....... *H02K 41/0354* (2013.01); *H02K 41/031* (2013.01); *H02K 2201/18* (2013.01)

(58) Field of Classification Search
CPC ........ H02K 41/0354; H02K 1/17; H02K 1/34; H02K 2201/18; H02K 3/28; H02K 41/031
USPC ...................................................... 310/12.06
See application file for complete search history.

(56) References Cited

U.S. PATENT DOCUMENTS

| | | | | |
|---|---|---|---|---|
| 6,355,993 | B1* | 3/2002 | Hazelton | G03F 7/70758 310/12.06 |
| 6,864,601 | B2* | 3/2005 | Sogard | H02K 11/01 310/12.25 |
| 6,952,086 | B1* | 10/2005 | Krefta | H02K 17/30 310/12.19 |
| 7,656,062 | B2 | 2/2010 | Binnard | |
| 7,830,046 | B2* | 11/2010 | Binnard | H02K 41/031 355/53 |
| 7,869,000 | B2* | 1/2011 | Arai | G03F 7/70716 355/53 |
| 8,432,072 | B2* | 4/2013 | Coakley | G03B 27/58 310/12.06 |
| 2005/0012403 | A1* | 1/2005 | Binnard | H02K 41/03 310/12.06 |
| 2006/0049697 | A1* | 3/2006 | Binnard | G03F 7/70758 310/12.22 |
| 2006/0221323 | A1* | 10/2006 | Cox | G03F 7/70716 355/72 |

(Continued)

*Primary Examiner* — Alex W Mok
(74) *Attorney, Agent, or Firm* — Beyer Law Group LLP

(57) ABSTRACT

A linear motor for use in semiconductor processing apparatuses. The linear motor is a three axis linear motor that includes magnets that cover end turns of coil windings in order to utilize the end turns to generate a force along a second or third axis. The coil windings are positioned between two magnet arrays and each magnet array has a magnet, such as a voice coil motor (VCM) magnet, positioned along one side to cover the endturns and provide a magnetic flux. A VCM back iron is positioned to provide a magnetic flux return path for the VCM magnets. The structure in conjunction with a DC offset produces a useful force.

19 Claims, 8 Drawing Sheets

(56) References Cited

U.S. PATENT DOCUMENTS

2008/0252151 A1* 10/2008 Binnard .............. G03F 7/70758
                                                              310/12.06
2008/0285004 A1* 11/2008 Binnard .............. G03F 7/70725
                                                              355/72
2009/0263747 A1* 10/2009 Coakley ................. G03B 27/58
                                                              430/311

* cited by examiner

THREE AXIS LINEAR ACTUATOR

CROSS-REFERENCE TO RELATED APPLICATIONS

This application claims priority to U.S. Provisional Application No. 62/278,798, filed on Jan. 14, 2016, which is herein incorporated by reference in its entirety.

BACKGROUND

The present invention relates generally to linear motors. More particularly, the invention relates to three-axis linear motors used in semiconductor processing apparatuses.

Exposure apparatuses for semiconductor processing are commonly used to transfer images from a reticle onto a semiconductor wafer during semiconductor processing. A typical exposure apparatus includes an illumination source, a reticle stage assembly that positions a reticle, an optical assembly, a wafer stage assembly that positions a semiconductor wafer, a measurement system, and a control system. For many exposure apparatuses, space is often at a premium. Thus, it is often desirable to make many of the components of the exposure apparatus as compact and efficient as possible.

One type of stage assembly includes a stage base, a stage that retains the wafer or reticle, and one or more movers that move the stage and the wafer or the reticle. One type of mover is a linear motor that moves the stage along a single axis. Because it is often necessary to move the stage along more than one axis, multiple linear motors are typically required to move the stage with more than one degree of freedom. These multiple linear motors can complicate the design of the stage assembly and occupy a significant amount of space in the exposure apparatus.

A common three phase linear motor includes a pair of spaced apart magnet arrays that are surrounded by a magnetic field and a conductor array positioned between the magnet arrays. A three phase electrical current is directed to the conductor array. The electrical current supplied to the conductor array generates an electromagnetic field that interacts with the magnetic field of the magnet arrays. This generates a controlled force that can be used to move the conductor array relative to the magnet arrays along a first axis.

Unfortunately, electrical current supplied to the conductor array also produces uncontrolled forces along a second axis (shown as the Z axis in the figures) that is orthogonal to the first axis, along a third axis (shown as the X axis in the figures) that is orthogonal to the first and second axes, and about the second axis. These forces can cause disturbances that are transferred to other components of the exposure apparatus and positional error. Such linear motors are typically sinusoidally commutated brushless motors with a magnetic flux distribution, which also is sinusoidal. In general, in such motors, the endturns of coil windings in the conductor array lead to no useful force production and as such only contribute to the power losses in the motor. Therefore, it would be desirable to minimize such power losses and to utilize the endturns of the coil windings in a useful manner to provide motion along a second or third axis. By utilizing the endturns to produce useful force, one also makes use of the space available in a more efficient manner.

SUMMARY

In accordance with an embodiment, an actuator is provided for applying independently controlled forces to a stage along a first axis and along a second axis that is perpendicular to the first axis. The actuator includes a magnetic component, a conductor component, and a DC offset in voltages and currents of the coil windings. The magnetic component includes a plurality of magnets and a magnet structure. The plurality of magnets are arranged in a first magnet array along the first axis and a second magnet array along the first axis and produce a magnetic field. The first magnet array and the second magnet array are spaced apart along the second axis to define a magnet gap. A magnet structure is positioned along each of the first and second magnet arrays. The conductor component includes multiple coil windings, and is positioned between the first magnet array and the second magnet array. The magnet structures cover endturns of the coil windings and produce a magnetic flux to interact with electric currents flowing in the endturns of the coil windings to produce a force.

In accordance with another embodiment, a linear actuator is provided. The linear actuator includes a first magnetic feature, a second magnetic feature, a conductor component, and a DC offset in voltages and currents of the coil windings. The first magnetic feature includes a first magnet array and a first magnet structure positioned along the first magnet array. The second magnetic feature includes a second magnet array and a second magnet structure positioned along the second magnet array. The first and second magnetic features are spaced apart. The conductor component includes multiple coil windings, and the conductor component is positioned between the first magnetic feature and the second magnetic feature. The first and second magnetic arrays produce a magnetic field and each of the magnet structures covers endturns of the coil windings, and the magnet structures produce a magnetic flux to interact with electric currents flowing in the endturns of the coil windings to produce a force.

In accordance with yet another embodiment, a linear actuator is provided. The linear actuator includes a conductor component and a magnetic component. The conductor component includes multiple coil windings. The magnetic component produces a flux density perpendicular to a desired direction of force having a component perpendicular to a direction of currents flowing in endturns of the coil windings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

The present invention relates generally to linear motors. More particularly, the invention relates to three-axis linear motors used in semiconductor processing apparatuses. In embodiments described herein, a magnetic structure is provided to produce a magnetic flux to interact with electric currents flowing in endturns of coil windings to provide useful force and motion. In particular embodiments, voice coil motor (VCM) magnets covering end turns of coil windings are provided to utilize the end turns to generate a force along a second or third axis.

Figure 1:
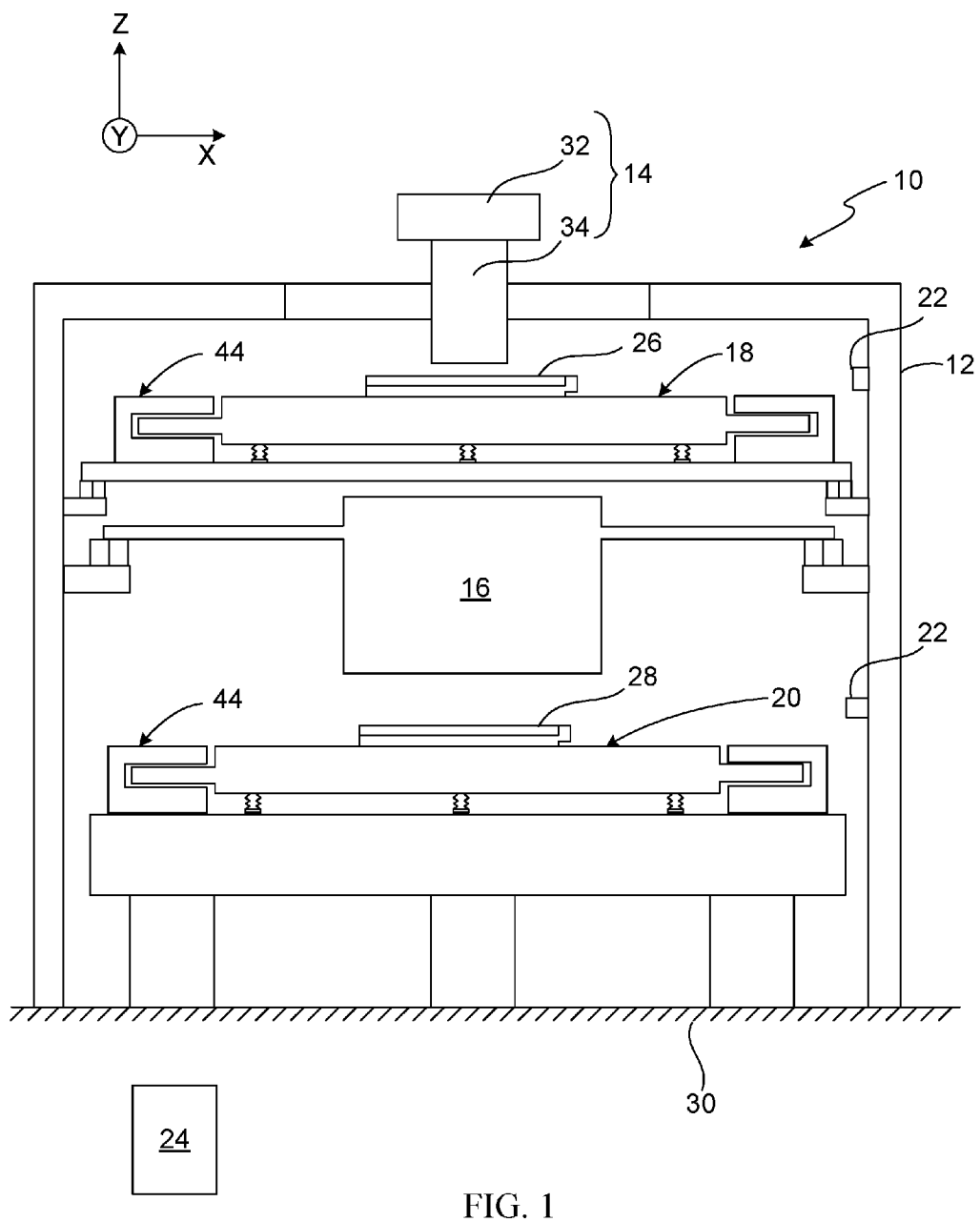
FIG. 1 is a schematic illustration of an exposure apparatus in accordance with an embodiment.

FIG. 1 is a schematic illustration of a typical precision assembly, such as an exposure apparatus 10 for semiconductor processing. The exposure apparatus 10 includes an apparatus frame 12, an illumination system 14 (irradiation apparatus), an optical assembly 16, a reticle stage assembly 18, a wafer stage assembly 20, a measurement system 22, and a control system 24. The design of the components of the exposure apparatus 10 can be varied to suit the design requirements of the exposure apparatus 10.

As an overview, in certain embodiments, one or both of the stage assemblies 18, 20 are uniquely designed to move and position a device with improved accuracy. More specifically, in certain embodiments, one or both stage assemblies 18, 20 includes one or more linear type movers 44 which can be controlled to independently generate controllable forces along a Y axis, along a Z axis, and along an X axis. This allows for the cancellation of undesired ripple in the forces along the Z axis, and along the X axis; and/or the active generation of non-zero forces along the Y axis, along the Z axis, and/or along the X axis to accurately position the device. As a result thereof, the linear type motors 44 can position a stage with improved accuracy, and the exposure apparatus 10 can be used to manufacture higher density wafers.

A number of Figures include an orientation system that illustrates the X axis, the Y axis that is orthogonal to the X axis, and the Z axis that is orthogonal to the X and Y axes. It should be noted that any of these axes can also be referred to as the first, second, and/or third axes.

The exposure apparatus 10 is particularly useful as a lithographic device that transfers a pattern (not shown) of an integrated circuit from a reticle 26 onto a semiconductor wafer 28. The exposure apparatus 10 mounts to a mounting base 30, e.g., the ground, a base, or floor or some other supporting structure.

There are a number of different types of lithographic devices. For example, the exposure apparatus 10 can be used as a scanning type photolithography system that exposes the pattern from the reticle 26 onto the wafer 28 with the reticle 26 and the wafer 28 moving synchronously. Alternatively, the exposure apparatus 10 can be a step-and-repeat type photolithography system that exposes the reticle 26 while the reticle 26 and the wafer 28 are stationary.

However, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern from a mask to a substrate with the mask located close to the substrate without the use of a lens assembly.

The apparatus frame 12 is rigid and supports the components of the exposure apparatus 10. The apparatus frame 12 illustrated in FIG. 1 supports the reticle stage assembly 18, the optical assembly 16 and the illumination system 14 above the mounting base 30.

The illumination system 14 includes an illumination source 32 and an illumination optical assembly 34. The illumination source 32 emits a beam (irradiation) of light energy. The illumination optical assembly 34 guides the beam of light energy from the illumination source 32 to the optical assembly 16. The beam illuminates selectively different portions of the reticle 26 and exposes the wafer 28. In FIG. 1, the illumination source 32 is illustrated as being supported above the reticle stage assembly 18. Typically, however, the illumination source 32 is secured to one of the sides of the apparatus frame 12 and the energy beam from the illumination source 32 is directed to above the reticle stage assembly 18 with the illumination optical assembly 34.

The illumination source 32 can be a g-line source (436 nm), an i-line source (365 nm), a KrF excimer laser (248 nm), an ArF excimer laser (193 nm), a $F_2$ laser (157 nm), or an EUV source (13.5 nm). Alternatively, the illumination source 32 can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 26 to the wafer 28. Depending upon the design of the exposure apparatus 10, the optical assembly 16 can magnify or reduce the image illuminated on the reticle 26. The optical assembly 16 need not be limited to a reduction system. It could also be a 1× or magnification system.

When far ultra-violet rays such as the excimer laser is used, glass materials such as quartz and fluorite that transmit far ultra-violet rays can be used in the optical assembly 16. When the $F_2$ type laser or x-ray is used, the optical assembly 16 can be either catadioptric or refractive (a reticle should also preferably be a reflective type), and when an electron beam is used, electron optics can consist of electron lenses and deflectors. The optical path for the electron beams should be in a vacuum.

Also, with an exposure device that employs EUV radiation (EUV) of wavelength 13.5 nm or lower, use of the catadioptric type optical system can be considered. For EUV the entire optical path should be in a vacuum. Examples of the catadioptric type of optical system include the disclosure Japan Patent Application Disclosure No. 8-171054 published in the Official Gazette for Laid-Open Patent Applications and its counterpart U.S. Pat. No. 5,668,672, as well as Japan Patent Application Disclosure No. 10-20195 and its counterpart U.S. Pat. No. 5,835,275. In these cases, the reflecting optical device can be a catadioptric optical system incorporating a beam splitter and concave mirror. Japan Patent Application Disclosure No. 8-334695 published in the Official Gazette for Laid-Open Patent Applications and its counterpart U.S. Pat. No. 5,689,377 as well as Japan Patent Application Disclosure No. 10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

The reticle stage assembly 18 holds and positions the reticle 26 relative to the optical assembly 16 and the wafer 28. Somewhat similarly, the wafer stage assembly 20 holds and positions the wafer 28 with respect to the projected image of the illuminated portions of the reticle 26.

Further, in photolithography systems, when linear motors (see U.S. Pat. No. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures in U.S. Pat. Nos. 5,623,853 and 5,528,118 are incorporated herein by reference.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically transferred to the floor (ground) by use of a frame member as described in U.S. Pat. No. 5,528,100 and published Japanese Patent Application Disclosure No. 8-136475. Additionally, reaction forces generated by the reticle (mask) stage motion can be mechanically transferred to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,100 and 5,874,820 and Japanese Patent Application Disclosure No. 8-330224 are incorporated herein by reference.

The measurement system 22 monitors movement of the reticle 26 and the wafer 28 relative to the optical assembly 16 or some other reference. With this information, the control system 24 can control the reticle stage assembly 18 to precisely position the reticle 26 and the wafer stage assembly 20 to precisely position the wafer 28. For example, the measurement system 22 can utilize multiple laser interferometers, encoders, and/or other measuring devices.

The control system 24 is connected to the reticle stage assembly 18, the wafer stage assembly 20, and the measurement system 22. The control system 24 receives information from the measurement system 22 and controls the stage assemblies 18, 20 to precisely position the reticle 26 and the wafer 28. The control system 24 can include one or more processors and circuits.

A photolithography system (an exposure apparatus) according to the embodiments described herein can be built by assembling various subsystems, including each element listed in the appended claims, in such a manner that prescribed mechanical accuracy, electrical accuracy, and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, a total adjustment is performed to make sure that accuracy is maintained in the complete photolithography system. Additionally, it is desirable to manufacture an exposure system in a clean room where the temperature and cleanliness are controlled.

Figure 2:
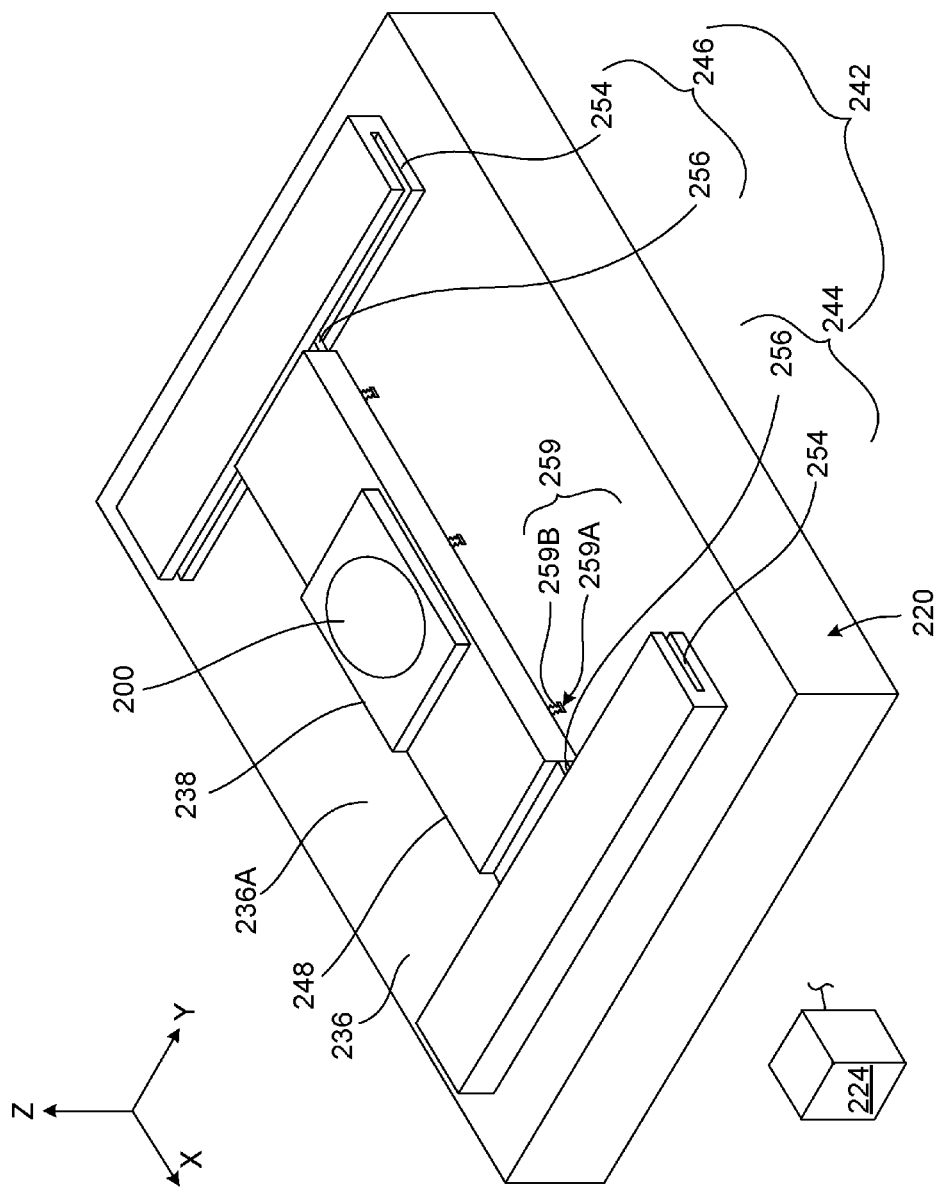
FIG. 2 is a simplified top perspective view of a stage assembly in accordance with an embodiment.

FIG. 2 is a simplified top perspective view of a control system 224 and one embodiment of a stage assembly 220 that is used to position a work piece 200. For example, the stage assembly 220 can be used as the wafer stage assembly 20 in the exposure apparatus 10 of FIG. 1. In this embodiment, the stage assembly 220 would position the wafer 28 (illustrated in FIG. 1) during manufacturing of the semiconductor wafer 28. Alternatively, the stage assembly 220 can be used to move other types of work pieces 200 during manufacturing and/or inspection, to move a device under an electron microscope (not shown), or to move a device during a precision measurement operation (not shown). For example, the stage assembly 220 could be designed to function as the reticle stage assembly 18 illustrated in FIG. 1.

In FIG. 2, the stage assembly 220 includes a stage base 236, a stage 238, and a stage mover assembly 242. The size, shape, and design of each these components can be varied. The control system 224 precisely controls the stage mover assembly 242 to precisely position the work piece 200.

In FIG. 2, the stage base 236 supports some of the components of the stage assembly 220 and guides the movement of the stage 238 along the X axis, along the Y axis and about the Z axis. In certain embodiments, the stage base 236 is generally rectangular shaped and includes a generally planar guide surface 236A that directly or indirectly supports and/or guides movement of the stage 238. In this embodiment, the guide surface 236A extends along the X and Y axes.

The stage 238 retains the work piece 200. In one embodiment, the stage 238 is generally rectangular shaped and includes a chuck (not shown) for holding the work piece 200. The stage mover assembly 242 moves and positions the stage 238. In FIG. 2, the stage mover assembly 242 includes a first mover 244, a spaced apart second mover 246, and a connector bar 248 that extends between the movers 244, 246.

The design of each mover 244, 246 can be varied to suit the movement requirements of the stage mover assembly 242. In FIG. 2, each of the movers 244, 246 includes a first mover component 254 and a second mover component 256 that interacts with the first mover component 254. In this embodiment, each of the movers 244, 246 is a uniquely designed and controlled linear motor, and one of the mover components 254, 256 is a magnetic component that includes one or more magnets, and one of the mover components 256, 254 is a conductor component that includes one or more conductors, e.g. coils. In FIG. 2, the first mover component 254 is the magnetic component and the second mover component 256 is the conductor component. Alternatively, the first mover component 254 can be the conductor component and the second mover component 256 can be the magnetic component.

In FIG. 2, for each mover 244, 246, the first mover component 254 is coupled to the stage base 236 and the second mover component 256 is secured to the connector bar 248. Alternatively, for example, the first mover component 254 of one or more of the movers 244, 246 can be secured to a counter/reaction mass or a reaction frame (not shown). The connector bar 248 supports the stage 238 and is moved by the movers 244, 246. In the embodiment shown in FIG. 2, the connector bar 248 is somewhat rectangular beam shaped.

Additionally, in the embodiment illustrated in FIG. 2, at least a portion of the weight of the connector bar 248, the stage 238, and the work piece 200 is supported along the Z axis relative to the stage base 236 with one or more support bearings 259 (two are illustrated in FIG. 2). In this embodiment, for example, the one or more support bearings 259 can support the dead weight of the connector bar 248, the stage 238, and the work piece 200 while allowing the movers 244, 246 to move and precisely position these components along the Z axis, about the X axis, and about the Y axis. Further, because the dead weight of these components is supported by the support bearings 259, the movers 244, 246 do not have to support these components and the movers 244, 246 are used for fine positional control along the Z axis, about the X axis, and about the Y axis. This reduces the amount of power consumed by the movers 244, 246 and the amount of heat generated by the movers 244, 246.

In an embodiment, each of the support bearings 259 can include a fluid bearing pad 259A that creates a vacuum preload type fluid bearing that supports the bearing pad 259A relative to the stage base 236, and a fluid bellows 259B that flexibly connects the bearing pad 259A to the connector bar 248. Alternatively, the bearing pad 259A can be replaced with another type of fluid bearing, a magnetic type bearing, or a roller type assembly and/or the fluid bellows 259B can be replaced with another type of flexible connector.

In FIG. 2, in certain embodiments, the control system 224 directs current to the second mover component 256 (i.e., the conductor component) of each mover 244, 246 to generate a controllable force for each mover 244, 246 along the Y axis ("first axis"), to generate a controllable force for each mover 244, 246 along the Z axis ("second axis"), and to generate a controllable force for each mover 244, 246 along the X axis ("third axis"). The control system 224 is described in more detail below.

Figure 3:
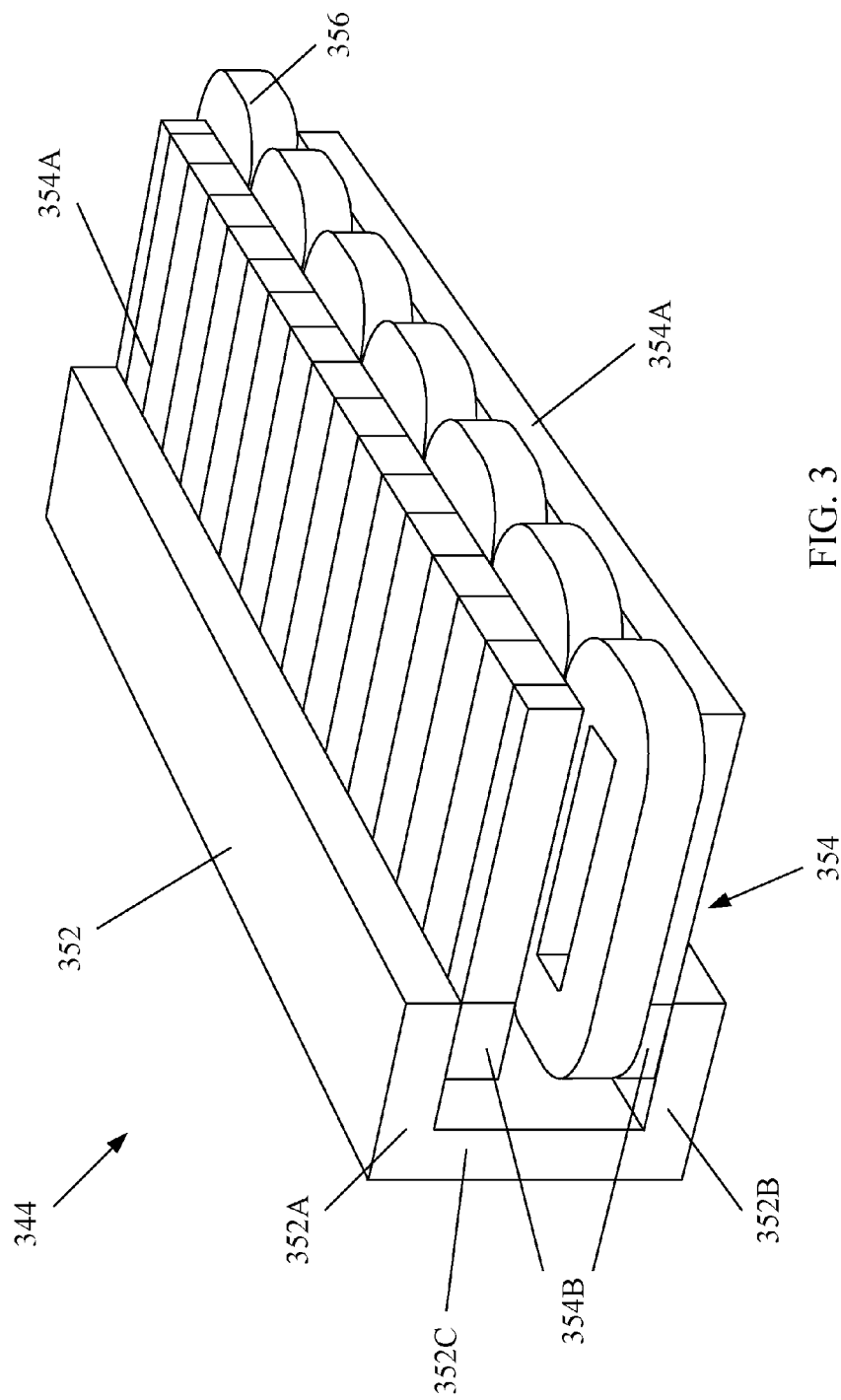
FIG. 3 is a front perspective view of an embodiment of a mover.

FIG. 3 is a simplified perspective view of a first embodiment of a mover 344 that can be used as the first mover 244 or the second mover 246 in FIG. 2, or for another usage. In this embodiment, the mover 344 includes a voice coil motor (VCM) back iron 352, a conductor component 356, and magnetic components 354. The conductor component 356 includes multiple coil windings, and is positioned between two magnetic components 354, as shown in FIG. 3. Alternatively, the mover 344 can be designed with more or fewer components than that illustrated in FIG. 3.

Each magnetic component 354 includes a magnet array 354A and a magnet structure 354B for producing a magnetic flux to interact with the electric currents flowing in the endturns of the coil windings to produce useful force. According to an embodiment, the flux producing magnet structure 354B is a VCM magnet. As shown in FIG. 3A, each of the magnet structures 354B is secured along a side of a magnet array 354A. In the illustrated embodiment, the magnet arrays 354A are Halbach magnet arrays. In some embodiments, the magnet structure 354B is in contact with the magnet array 354A. In other embodiments, there is a gap between the magnet structure 354B and the magnet array 354A. The VCM back iron 352 provides a return flux for the magnetic flux produced by the magnet structure 354B. In some embodiments, the magnet structure 354B can be attached to the VCM back iron 352 using adhesive or other mechanical fasteners.

The component of the magnetic flux density perpendicular to the direction of the electric currents flowing in the end-turns will produce the useful force. The VCM back iron 352 may provide a return path for the magnetic flux in order to maximize the value of the flux density interacting with the electric currents flowing in the coil windings. This will, in turn, maximize the force producing capability and the efficiency of the end-turn motor. If no return path by a high permeability back-iron (yoke) is utilized, the force producing capability of the motor may be diminished. The important function for the magnet structure 354B is to produce a flux density perpendicular to the desired direction of motion (force) which has a component perpendicular to the direction of the currents flowing in the end-turns of the coil windings. The interaction between this component of the magnetic flux density and the end-turn currents produces the desired force/motion.

According to this embodiment, a DC offset in the applied voltages/currents is also applied to the phase windings. Without the DC offset, the magnet structure 354B (e.g., VCM magnet) would only produce what are considered to be disturbance forces. Without the flux density produced by the magnet structure 354B, the DC offset would not provide a means for a controlled motor action unless a more sophisticated control strategy is utilized.

It will be understood that the concept of the end-turn motor with the DC offset can work in conjunction with a balanced 3-phase, 4-phase, 6-phase, 8-phase, . . . motor. In fact, as long as the number of phase windings is a multiple of 3 or 4, the concept of the end-turn motor with a DC voltage/current offset will be feasible.

Due to the fact that the DC voltage/current offset is superimposed on the sinusoidal phase voltage/current, the same amplifier that supplies the sinusoidal voltage/current to a phase winding can be used to supply the DC offset. As a result, no additional amplifiers will be required to accommodate the DC offset.

Figure 4:
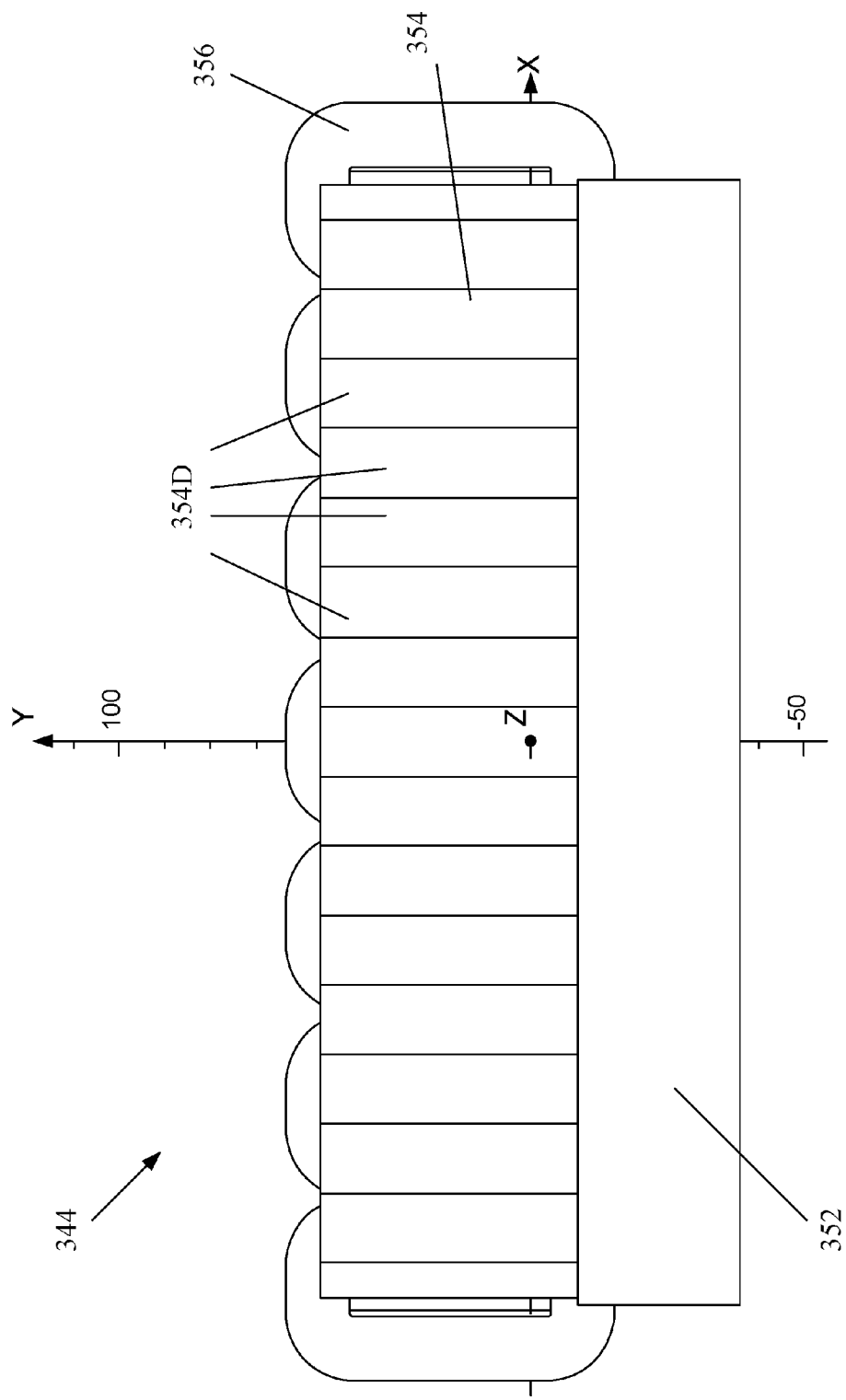
FIG. 4 is a top view of the embodiment of the mover shown in FIG. 3.
Figure 5:
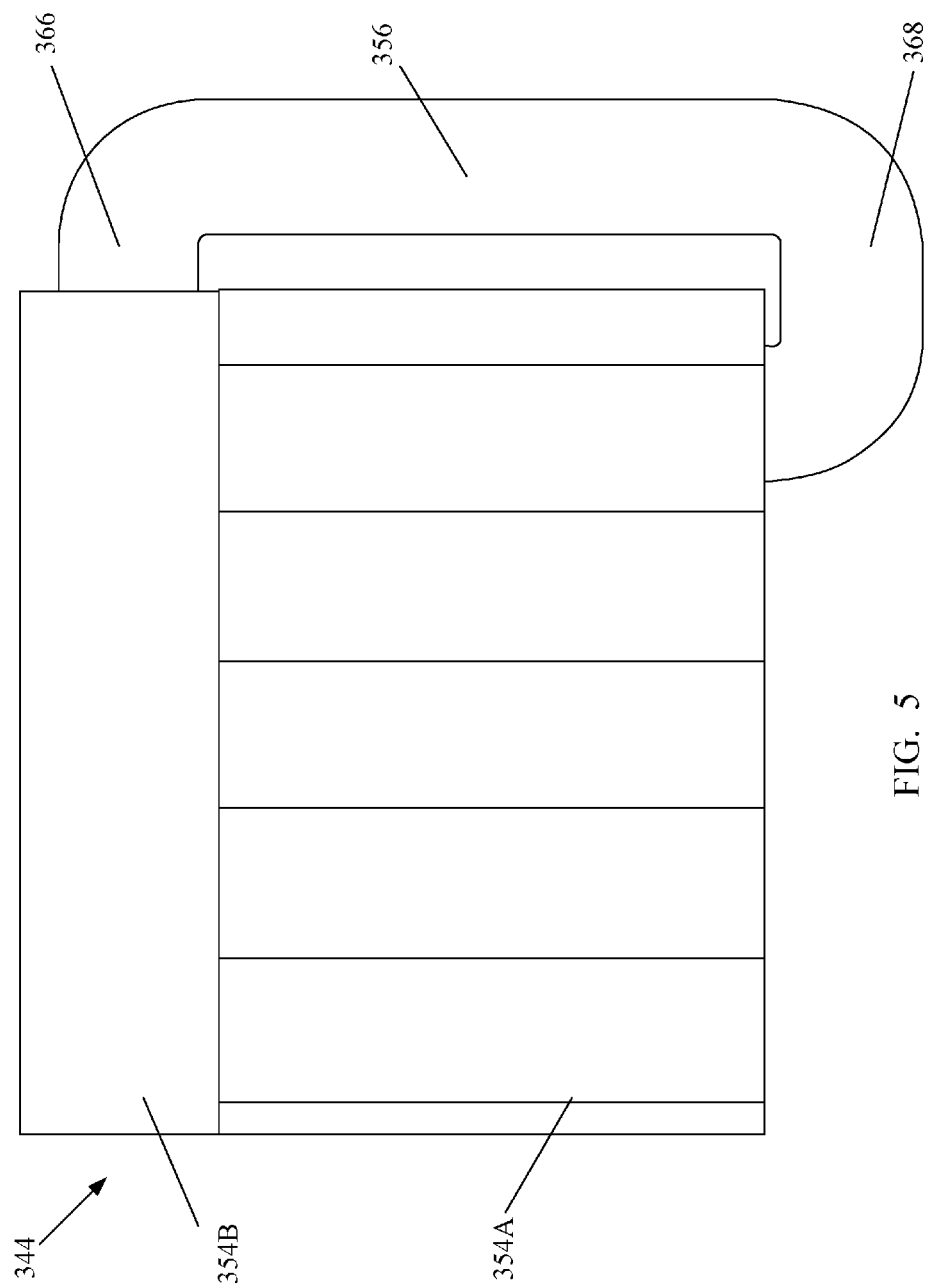
FIG. 5 is a simplified top view of the embodiment of the mover shown in FIGS. 3 and 4.

FIG. 4 is a top view of the embodiment of the mover 344 shown in FIG. 3. FIG. 5 is a simplified top view of the mover 344 shown in FIG. 3 with the VCM back iron 352 removed and showing only one coil of the conductor component 356. Alternatively, the conductor array 356 can include a plurality of coils. For example, the conductor array 356 can include a multiple of three coils so that the conductor array 356 can be operated as a three phase motor.

In this embodiment, the mover 344 is uniquely designed to move and position a device 200 (illustrated in FIG. 2) with improved accuracy, or with fewer physical actuators. In this embodiment, the mover 344 can be an actuator used for applying independently controlled forces to a stage 238 (illustrated in FIG. 2) along a first axis (the Y axis), along a second axis (the Z axis), and along a third axis (the X axis). More specifically, in this embodiment, the mover 344 is a linear type motor that can be controlled by a control system to generate independently controllable forces along the first axis, along the second axis, and along the third axis.

Figure 7:
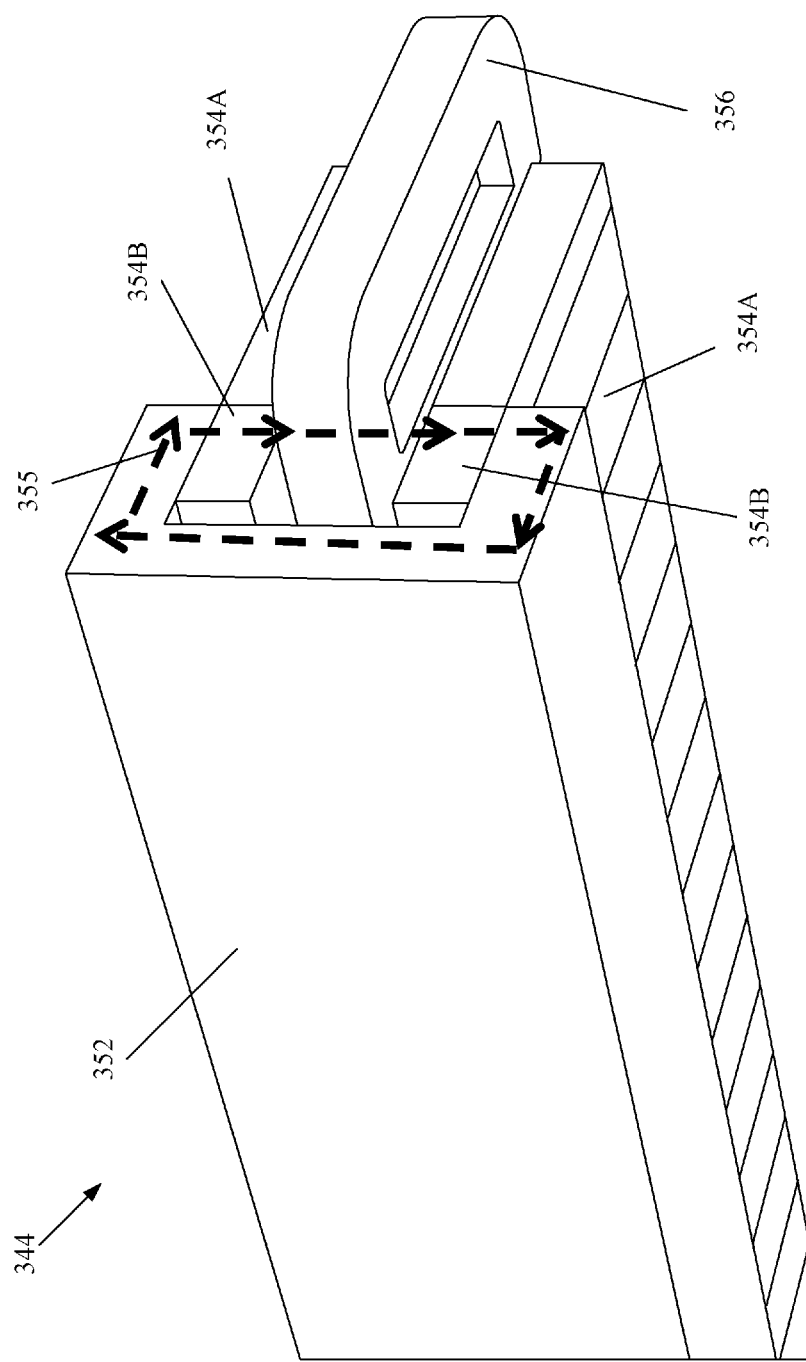
FIG. 7 is a back perspective view of the embodiment of the mover shown in FIGS. 3-5.
Figure 8:
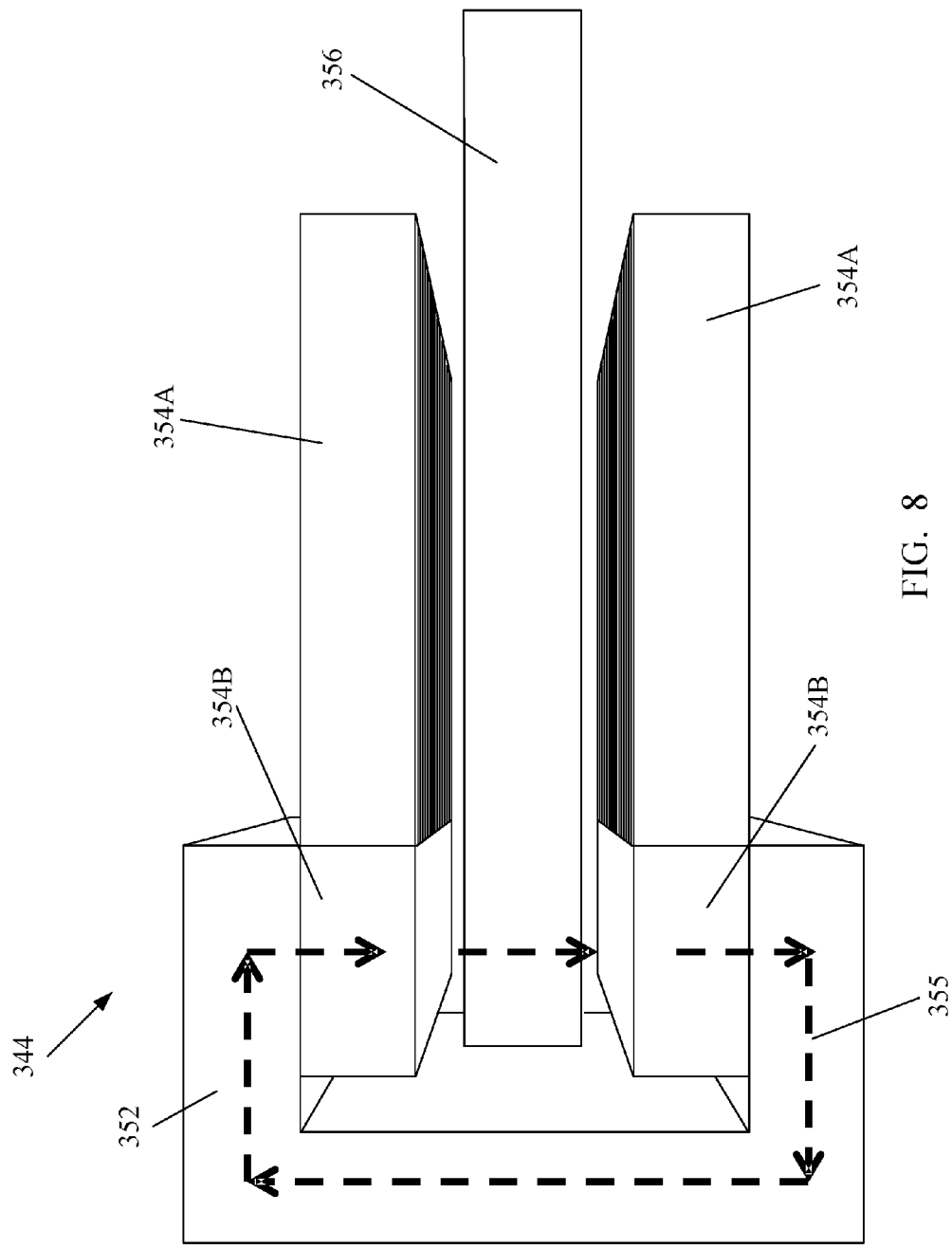
FIG. 8 is a side view of the embodiment of the mover shown in FIGS. 3-5 and 7.

As shown in FIG. 3, the VCM back iron 352 supports some of the components of the mover 344. In the illustrated embodiment, the VCM back iron 352 is generally rigid and shaped somewhat similar to a "C" or a sideways "U". The VCM back iron 352 includes a generally flat, rectangular shaped, upper side 352A, a generally flat, rectangular shaped, lower side 352B that is spaced apart from the upper side 352A, and a generally rectangular shaped connector side 352C that connects the upper side 352A and the lower side 352B. In some embodiments, portions of the VCM back iron 352 can be made of a highly magnetically permeable material, such as a soft iron that provides some shielding of the magnetic fields. The VCM back iron 352 also provides a low reluctance magnetic flux return path 355 for the magnetic fields of the magnetic components 354 (as shown in FIGS. 7 and 8). In the illustrated embodiments, the magnet array 354A is a Halbach array which does not require a magnetically permeable material in the VCM back iron 352. Other types of magnet arrays may also be used.

In one embodiment, the VCM back iron 352 is secured to the stage base 236 (illustrated in FIG. 2) or a reaction type (e.g., a reaction frame or a countermass) assembly. In this embodiment, the conductor component 356 is secured to the connector bar 248 (illustrated in FIG. 2) and moves relative to the magnetic component 354. Alternatively, for example, the conductor component 356 can be secured to the stage base 236, the magnetic component 354 can be secured to the connector bar 248, and the magnetic component 354 can be moved relative to the conductor component 356.

The magnetic components 354 produce a magnetic field, which is preferably strongest in the space between upper side 352A and lower side 352B of the VCM back iron 352. In FIG. 3, the magnetic component 354 includes an upper VCM magnet 354B that is secured to the lower side 352A of the VCM back iron 352, and a lower VCM magnet 354B that is secured to the upper side 352B of the VCM back iron 352. With this design, the VCM magnets 354B are secured to opposite sides of the VCM back iron 352, on opposite sides of the conductor component 356, and a magnet gap separates the magnetic components 354.

Each of the magnet arrays 354A includes a plurality of magnets 354D arranged in an array along the X axis that produce a magnetic field. The design, the positioning, and the number of magnets 354D in each magnet array 354A can be varied to suit the design requirements of the mover 344. Each magnet array 354A can include more or fewer magnets 354D. Each of the magnets 354D can be made of a high energy product, rare earth, permanent magnetic material such as NdFeB. Alternatively, for example, each magnet 354D can be made of a low energy product, ceramic or other type of material that is surrounded by a magnetic field.

The magnets 354D in each magnet array 354A are oriented so that the poles facing the magnet gap alternate between the North pole, transversely oriented, and the South pole. This type of array is commonly referred to as a Halbach array. Alternatively, each magnet array 354A can be designed without the transversely oriented magnets.

The polarity of the pole facing the magnet gap of each of the magnets 354D in the upper magnet array 354A is opposite from the polarity of the pole facing the magnet gap of the corresponding magnet 354D in the lower magnet array 354A. Thus, North poles face South poles across the magnet gap. This leads to strong magnetic fields in the magnet gap and strong force generation capability.

Figure 6:
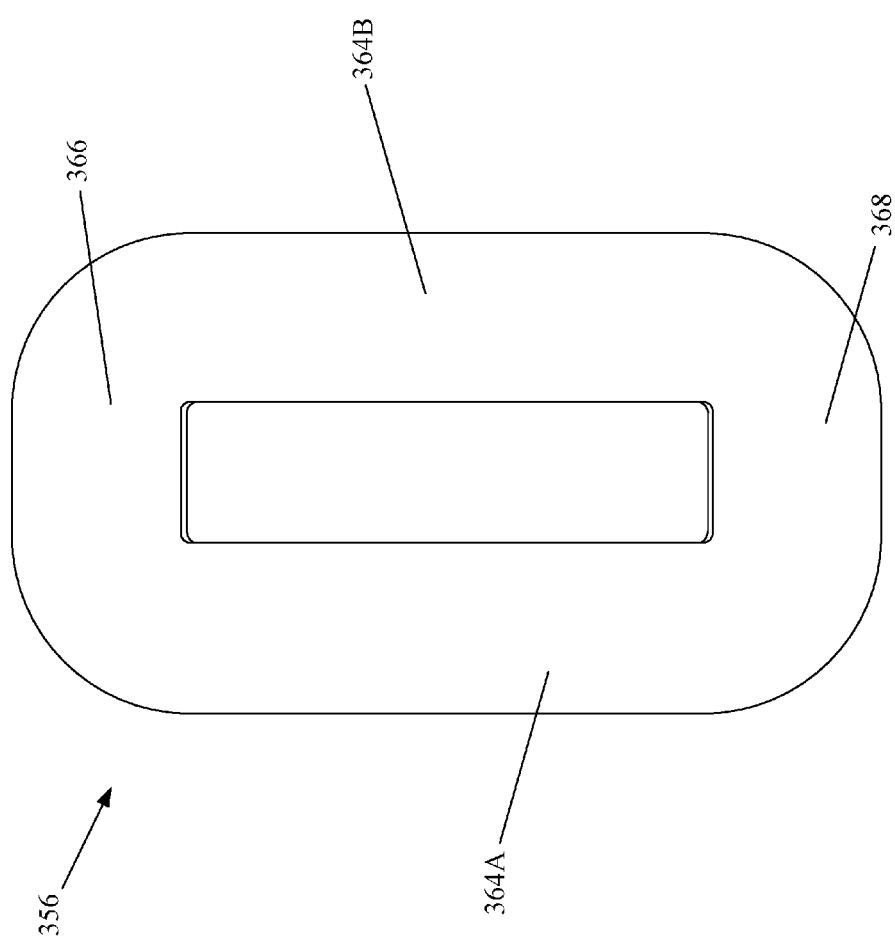
FIG. 6 is a top view of an embodiment of a coil winding.

In one embodiment, as shown in FIG. 6, each coil winding of the conductor component 356 has a racetrack coil configuration, wherein the coil includes the first upper coil leg 364A, the second upper coil leg 364B, an upper end turn 366, and a lower end turn 368. In this embodiment, the upper end turn 366 and the lower end turn 368 are somewhat semi-circular in shape, and each of the upper end turn 366 and the lower end turn 368 extends between the first upper coil leg 364A and the second upper coil leg 364B so as to form the substantially oval-shaped racetrack coil configuration. In an alternative embodiment, the first conductor array 356A can be designed so that the coil is wound in a more rectangular shape rather than having the oval racetrack coil configuration. Such alternative design can improve the thrust efficiency along the X axis (because the endturns 366, 368 are larger), while decreasing some efficiency along the Y axis (because the coil legs 364A, 364B are shorter). Still alternatively, the conductor component 356 can be designed to include conductor arrays having a plurality of overlapping conductors.

As shown in the illustrated embodiment, one set of endturns 366 of the conductor component 356 is at least partially covered by a VCM magnet 354B. According to another embodiment, the endturns 368 are also at least partially covered by a VCM magnet secured along an opposite side of the magnet array 354A. In some embodiments, the endturns 366, 368 can be fully covered by VCM magnets 354B.

An exemplary embodiment of a three phase motor will be discussed below. However, it will be understood that the concepts for a linear motor described herein can apply to motors having different numbers of phases. For a sinusoidally commutated three phase linear motor, the reference voltages across the three phases to produce motion along the x axis or the z axis (levitation axis), can be written as:

$$V_1 = V_{dc} + V_0 \sin\left(\omega t + \frac{4\pi}{3}\right)$$
$$V_2 = V_{dc} + V_0 \sin(\omega t)$$
$$V_3 = V_{dc} + V_0 \sin\left(\omega t - \frac{4\pi}{3}\right)$$

The voltages for the x axis and the levitation axis, i.e. z axis, should be in quadrature, i.e. phase angle of $\pi/2$ radians. The discussion below is applicable to both x and z axes. Without loss of generality, the x-axis will be discussed.

In a three-phase linear motor, these reference voltages will produce electrical currents within the three phases, which can be written as:

$$I_1 = I_{dc} + I_0 \sin\left(\omega t + \frac{4\pi}{3} + \varphi\right)$$
$$I_2 = I_{dc} + I_0 \sin(\omega t + \varphi)$$
$$I_3 = I_{dc} + I_0 \sin\left(\omega t - \frac{4\pi}{3} + \varphi\right)$$

For the case when the linear motor magnets provide a sinusoidal flux density distribution in the magnetic gap, the force produced along the x-axis, i.e. the primary axis of motion of the linear motor, can be written as:

$$F = \left(I_{dc} + I_0 \sin\left(\omega t + \frac{4\pi}{3} + \varphi\right)\right)\left(K_e \sin\left(\omega t + \frac{4\pi}{3}\right)\right) + $$
$$(I_{dc} + I_0 \sin(\omega t + \varphi))(K_e \sin(\omega t)) + $$
$$\left(I_{dc} + I_0 \sin\left(\omega t - \frac{4\pi}{3} + \varphi\right)\right)\left(K_e \sin\left(\omega t - \frac{4\pi}{3}\right)\right)$$

After some algebraic manipulation, it can be shown that the above equation reduces to the following:

$$F = \left(\frac{3}{2}\right) K_e I_0 \sin(\varphi)$$

The effect of the end-turns 366 of the coil windings of the conductor component 356 will be discussed below. It will be understood that in this embodiment, the three phase motor has three coil windings and that the currents in the three coil windings interact with the VCM magnets 354B to produce a force along the y-axis. As noted above, the conductor array 356 can include a multiple of three coil windings so that the conductor array 356 can be operated as a three phase motor. The VCM magnets 354B produce magnetic flux which crosses the air-gap between the VCM magnets 354B where the endturns 366 of the coil windings reside. The flux density is mostly along the Z axis and may be considered to be constant in magnitude. The three end-turn sections 366 of the three coil windings produce the following forces:

$$F_{end1} = F_{dc} + F_{end0} \sin\left(\omega t + \frac{4\pi}{3} + \varphi\right)$$

$$F_{end2} = F_{dc} + F_{end0} \sin(\omega t + \varphi)$$

$$F_{end3} = F_{dc} + F_{end0} \sin\left(\omega t - \frac{4\pi}{3} + \varphi\right)$$

The resultant force due to the three phases can be obtained by adding together the three force components set forth above. The resulting force due to the "end-turn VCM" can then be written as follows:

$$F_{VCM} = F_{end1} F_{end2} F_{end3} = 3 F_{dc}$$

This resultant force $F_{VCM}$ provides a useful force for motion along a second axis (i.e., y-axis) and allows the linear motor to control the motion along the perpendicular direction, e.g. y-axis.

Although only a few embodiments of the invention have been described in detail, it should be appreciated that the invention may be implemented in many other forms without departing from the spirit or scope of the invention. In view of all of the foregoing, it should be apparent that the present embodiments are illustrative and not restrictive and the invention is not limited to the details given herein, but may be modified within the scope and equivalents of the appended claims.

What is claimed is:

1. An actuator for applying independently controlled forces to a stage along a first axis and along a second axis that is perpendicular to the first axis, the actuator comprising:
a magnetic component comprising:
a plurality of magnets arranged in a first magnet array along the first axis and a plurality of magnets arranged in a second magnet array along the first axis that produce a magnetic field, the first magnet array and the second magnet array being spaced apart along the second axis to define a magnet gap; and
a magnet structure positioned along each of the first and second magnet arrays, wherein each of the first and second magnet arrays is directly in contact with the magnet structure;
a conductor component comprising multiple coil windings, wherein the conductor component is positioned between the first magnet array and the second magnet array and wherein each of the magnet structures covers endturns of the coil windings, wherein the magnet structures produce a magnetic flux to interact with electric currents flowing in the endturns of the coil windings to produce a force; and
a DC offset in voltages and currents of the coil windings.

2. The actuator of claim 1, wherein each of the magnet structures is a VCM magnet.

3. The actuator of claim 1, further comprising a VCM back iron that provides a return flux path for the magnetic flux produced by the magnet structures.

4. The actuator of claim 3, wherein the VCM back iron supports the magnet structures.

5. The actuator of claim 3, wherein the magnet structures are attached to the VCM back iron.

6. The actuator of claim 3, wherein the VCM back iron comprises magnetically permeable material.

7. The actuator of claim 1, wherein the magnet arrays are Halbach arrays.

8. A linear actuator comprising:
a first magnetic feature comprising a first magnet array and a first magnet structure positioned along the first magnet array, wherein the first magnet array is directly in contact with the first magnet structure;
a second magnetic feature comprising a second magnet array and a second magnet structure positioned along the second magnet array, wherein the second magnet array is directly in contact with the second magnet structure and wherein the first and second magnetic features are spaced apart;
a conductor component comprising multiple coil windings, the conductor component positioned between the first magnetic feature and the second magnetic feature; and
a DC offset in voltages and currents of the coil windings, wherein the first and second magnetic arrays produce a magnetic field and wherein each of the magnet structures covers endturns of the coil windings, wherein the magnet structures produce a magnetic flux to interact with electric currents flowing in the endturns of the coil windings to produce a force.

9. The linear actuator of claim 8, wherein the first and second magnet structures are VCM magnets.

10. The linear actuator of claim 9, further comprising a VCM back iron to provide a return path for the magnetic flux.

11. The linear actuator of claim 10, the VCM back iron supports the magnet structures.

12. The linear actuator of claim 10, wherein the VCM back iron comprises magnetically permeable material.

13. The linear actuator of claim 9, wherein the first and second magnet arrays are Halbach arrays.

14. A linear actuator comprising:
a conductor component comprising multiple coil windings;
a magnetic component for producing a flux density perpendicular to a desired direction of force, the force having a component perpendicular to a direction of currents flowing in endturns of the coil windings, wherein the magnetic component comprises:
a plurality of magnets arranged in a first magnet array along a first axis and a plurality of magnets arranged in a second magnet array along the first axis that produce a magnetic field, the first magnet array and the second magnet array being spaced apart along a second axis to define a magnet gap, the second axis perpendicular to the first axis, wherein the conductor component is positioned between the first magnet array and the second magnet array; and a magnet structure positioned along each of the first and second magnet arrays, wherein each of the first and second magnet arrays is directly in contact with the magnet structure, wherein the first and second magnetic arrays produce a magnetic field and wherein each of the magnet structures covers endturns of the coil windings, wherein the magnet structures produce a magnetic flux to interact with electric currents flowing in the endturns of the coil windings to produce a force; and a DC offset in voltages and currents of the coil windings.

15. The linear actuator of claim 14, wherein the magnet arrays are Halbach arrays.

16. The linear actuator of claim 14, wherein each of the magnet structures is a VCM magnet.

17. The linear actuator of claim 16, wherein the magnetic component further comprises a VCM back iron that provides a return flux path for the magnetic flux produced by the magnet structures, wherein the VCM back iron supports the magnet structures.

18. The linear actuator of claim 16, wherein the magnet structures are attached to the VCM back iron.

19. The linear actuator of claim 16, wherein the VCM back iron comprises magnetically permeable material.

* * * * *